United States Patent
Anderson et al.

(10) Patent No.: US 8,713,280 B2
(45) Date of Patent: Apr. 29, 2014

(54) HARD DISK DRIVES HAVING DIFFERENT ROTATIONAL SPEEDS

(75) Inventors: Eric A. Anderson, Palo Alto, CA (US); Ludmila Cherkasova, Sunnyvale, CA (US); Arif A. Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 13/259,210

(22) PCT Filed: Oct. 30, 2009

(86) PCT No.: PCT/US2009/062848
§ 371 (c)(1),
(2), (4) Date: Sep. 23, 2011

(87) PCT Pub. No.: WO2011/053318
PCT Pub. Date: May 5, 2011

(65) Prior Publication Data
US 2012/0023289 A1   Jan. 26, 2012

(51) Int. Cl.
*G06F 12/06* (2006.01)
*G06F 1/26* (2006.01)

(52) U.S. Cl.
USPC ................. 711/170; 711/E12.019

(58) Field of Classification Search
USPC .................. 711/114, 170, E12.019
See application file for complete search history.

(56) References Cited

U.S. PATENT DOCUMENTS

| | | | |
|---|---|---|---|
| 6,400,892 B1 * | 6/2002 | Smith | 386/344 |
| 6,411,457 B2 * | 6/2002 | Yamashita et al. | 360/73.03 |
| 6,571,310 B1 * | 5/2003 | Ottesen et al. | 711/5 |
| 2005/0138284 A1 * | 6/2005 | Cohn et al. | 711/114 |
| 2005/0188248 A1 * | 8/2005 | O'Brien et al. | 714/5 |
| 2005/0204097 A1 * | 9/2005 | Kistler et al. | 711/114 |
| 2008/0010234 A1 * | 1/2008 | Nakagawa et al. | 707/1 |
| 2008/0133831 A1 * | 6/2008 | Delaney et al. | 711/114 |
| 2008/0168228 A1 * | 7/2008 | Carr et al. | 711/117 |
| 2009/0198877 A1 * | 8/2009 | Pua et al. | 711/103 |
| 2009/0276588 A1 * | 11/2009 | Murase | 711/160 |
| 2010/0115222 A1 * | 5/2010 | Usami | 711/170 |

* cited by examiner

Primary Examiner — Hal Schnee

(57) ABSTRACT

A system includes a number of hard disk drives and a controller. Each hard disk drive is selected from a number of different hard disk drive types. Each hard disk drive type has a different speed at which the hard disk drives of the hard disk drive type rotate to read and write data. At least one of the hard disk drives is of a different hard disk drive type than at least one other of the hard disk drives. The controller, responsive to a request to write particular data to the hard disk drives, is to select a given hard disk drive of the hard disk drives based on a type of the particular data, and is to write the particular data to the given hard disk drive.

15 Claims, 3 Drawing Sheets

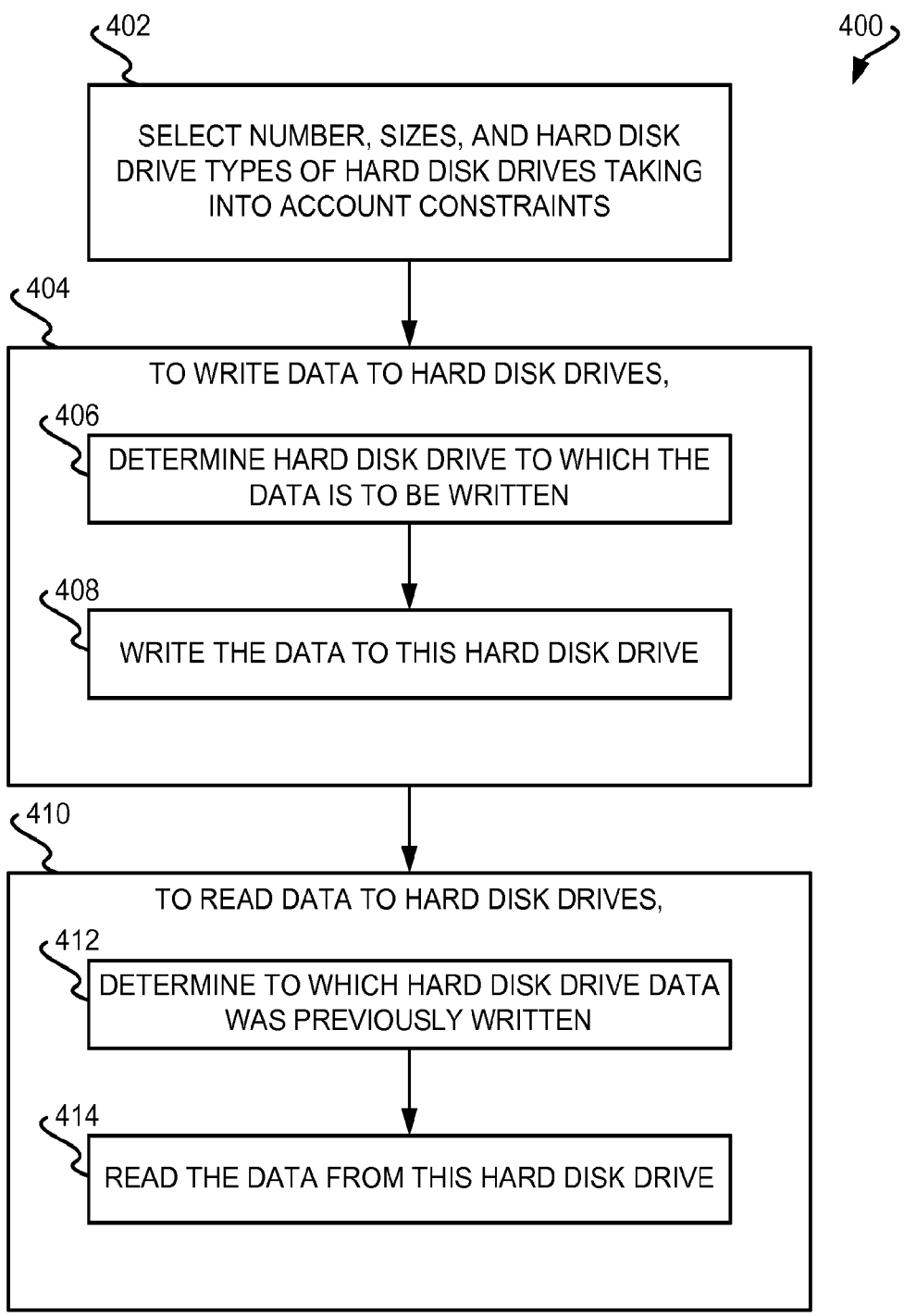

HARD DISK DRIVES HAVING DIFFERENT ROTATIONAL SPEEDS

BACKGROUND

A paramount part of any type of computing system is the storage of data. One popular way to store data in a non-volatile manner—i.e., such that the data remains stored even when power is removed from the computing system—is to employ a hard disk drive. A hard disk drive is an economical choice to store large amounts of data, and is virtually omnipresent in computing systems. Within a hard disk drive, data is magnetically stored on one or more storage surfaces, or platters, of the drive.

BRIEF DESCRIPTION OF THE DRAWINGS

FIG. 4 is a flowchart of a method, according to an embodiment of the present disclosure.

DETAILED DESCRIPTION

Figure 1:
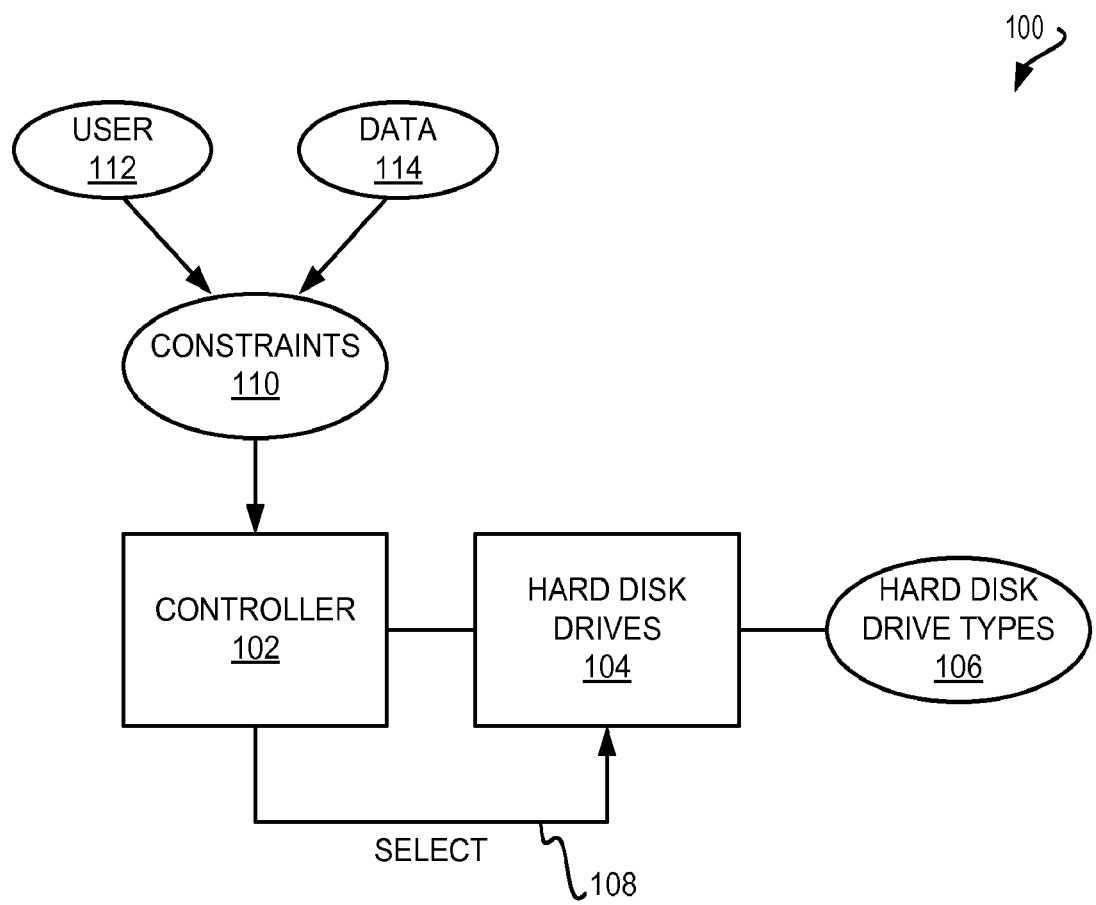
FIG. 1 is a diagram of a system including a number of hard disk drives selected from different hard disk drive types, according to an embodiment of the present disclosure.

As noted in the background, virtually all computing systems use hard disk drives to store data in a non-volatile manner. For improved performance, manufacturers have developed hard disk drives that have their storage surfaces rotated at increasingly higher speeds. For example, within desktop computing environments, 5,400 rotations-per-minute (RPM) hard disk drives have increasingly been replaced by 7,200 RPM drives. Within server computing environments, 10,000 RPM hard disk drives have increasingly been replaced by 12,000 RPM and 15,000 RPM drives.

Unfortunately, hard disk drives that spin their storage surfaces at higher rotational speeds consume significantly more power than hard disk drives that spin their storage surfaces at lower rotational speeds. In general, the amount of power used by a hard disk drive is roughly proportional to the cube of the drive's rotational speed. Thus, while a 7,200 RPM hard disk drive spins 33% faster than a 5,400 RPM hard disk drive does, it consumes more than 137% more power than a 5,400 RPM drive does. Likewise, while a 15,000 RPM drive spins 50% faster than a 10,000 RPM hard disk drive does, it consumes more than 237% more power than a 10,000 RPM drive does.

As such, employing faster hard disk drives to achieve better performance is antithetical to conserving power within a computing system. A hypothetical solution to this problem that has been proposed is to have a variable-speed hard disk drive, in which the storage surfaces of the drive are rotated at speeds commensurate with desired performance and power consumption objectives. However, such a hypothetical hard disk drive is in fact presently impossible to achieve in reality. This is because present hard disk drive technology imposes the constraint that if data is written to a storage surface of a hard disk drive while rotating at a given speed, the data has to be read from the surface while rotating at the exact same speed, and not at a lower or a higher speed.

The inventors have developed an approach to balance performance with power consumption that satisfies this constraint. Rather than having just a single hard disk drive that rotates at a given speed, or a number of hard disk drives that all rotate at a given speed as is common in hard disk arrays, the inventive approach provides for a number of hard disk drives that rotate at different speeds. The number of the hard disk drives and the speeds at which the drives rotate can be selected to achieve desired performance and power consumption constraints.

For example, large amounts of infrequently accessed archival data can be stored on one or more hard disk drives that have a large amount of storage space but that rotate at relatively slow speeds to decrease power consumption. By comparison, lesser amounts of frequently accessed data can be stored a lesser number of hard disk drives that have a smaller amount of storage space but that rotate at relatively high speeds to maximize performance. Power consumption is decreased overall as compared to storing both types of data on relatively fast hard disk drives that consume more power, while performance is still maximized for the frequently accessed data.

FIG. 1 shows a system 100, according to an embodiment of the disclosure. The system 100 includes a controller 102 and a number of hard disk drives 104. The hard disk drives 104 are each selected from a number of different hard disk drive types 106. Each hard disk drive type 106 has or corresponds to a different speed at which the hard disk drives 104 of this hard disk drive type 106 rotate to read and write data. At least one of the hard disk drives 104 has a different hard disk drive type 106 than at least one other of the hard disk drives 104.

As a rudimentary example, a first hard disk drive type 106 has a single speed at which the hard disk drives 104 of the first hard disk drive type 106 rotate to read and write data. A second hard disk drive type 106 has a different single speed at which the hard disk drives 104 of the second hard disk drive type 106 rotate to read and write data. All data written to a given hard disk drive 104 while being rotated at a particular speed has to be read from this hard disk drive 104 while rotating at this same particular speed, and not at any other speed.

However, in one embodiment, there is an additional hard disk drive type 106 that has a number of different speeds at which the hard disk drives 104 of this type 106 rotate to read data from and write data to these hard disk drives 104. Such hard disk drives are described in the copending PCT patent application entitled "Hard disk drive having regions corresponding to different speeds at which storage surface rotates," filed on Oct. 30, 2009, and assigned patent application no. PCT/US09/62817. Within such a hard disk drive, however, if data is written while the drive rotates at a given speed, the hard disk drive has to rotate at this same speed for this data to be read from the drive, although different data can be written (and thus read) at different rotational speeds of the drive.

The controller 102 is used to select the number of the hard disk drives 104, the size of each hard disk drive 104, and the hard disk drive type 106 of each hard disk drive 104, as indicated by the arrow 108. The size of a hard disk drive is the amount of storage space of the hard disk drive. In one embodiment, there may be a predetermined number of different sizes and types of hard disk drives from which the hard disk drives 104 can be selected. In another embodiment, the controller 102 may be permitted to choose from a virtually unlimited number of different sizes and types of hard disk drives from which the hard disk drives 104 can be selected.

Conventional hard disk drives are available in a variety of different sizes but in a relatively limited number of rotational speeds. For example, such rotational speeds may be 4,200 RPM, 5,400 RPM, 7,200 RPM, 10,000 RPM, 12,000 RPM, and 15,000 RPM. The controller 102 may thus select the number, sizes, and hard disk drive types 106 of the hard disk drives 104 such that each hard disk drive 104 has a rotational speed of 4,200 RPM, 5,400 RPM, 7,200 RPM, 10,000 RPM, 12,000 RPM, or 15,000 RPM.

However, the inventors have determined that hard disk drives can be easily manufactured so that there is a greater granularity in the types of their rotational speeds. For example, hard drives may be manufactured so that they have rotational speeds varying from 1,000 RPM to 15,000 RPM in 1,000 RPM or smaller increments. The controller 102 may thus select the number, sizes, and hard disk drive types 106 of the hard disk drives 104 such that each hard disk drive 104 has a rotational speed between 1,000 RPM to 15,000 RPM in 1,000 RPM or smaller increments.

That the controller 102 selects the hard disk drives 104 from the number, sizes, and hard disk drive types 106 from hard disk drives that are available can mean one of two different things. First, the hard disk drives that are available may be the hard disk drives that can be purchased and/or manufactured, albeit not necessarily that are currently on-hand. For example, the controller 102 may have at its disposal a catalog of hard disk drives of varying sizes and hard disk drive types 106 that can be purchased, in nearly any quantity desired.

Second, the hard disk drives that are available may be the hard disk drives that are currently on-hand. For example, the system 100 may have a limited number of hard disk drives of various sizes and hard disk drive types 106 from which the hard disk drives 104 can be selected. The hard disk drives that the controller 102 does not select as the hard disk drives 104 are therefore powered down, or not connected, so that they do not consume power.

The controller 102 selects the hard disk drives 104 based on one or more constraints 110. The constraints 110 can include constraints 110 that are specified by a user 112, as well as constraints 110 that result from data 114 that is expected to be stored on the hard disk drives 104. The data 114 may be divided, for instance, into a number of different data types, which correspond to data of different kinds. The controller 102 selects the hard disk drives 104 while taking into account the constraints 110 by using a model or an algorithm, by solving a linear programming problem, or by following a different approach.

The constraints 110 that are specified by the user 112 can include the desired power consumption by the hard disk drives 104, as well as the total cost of all the hard disk drives 104, where for instance, faster and/or higher-capacity hard disk drives may cost more than slower and/or lesser-capacity drives. The constraints 110 that are specified by the user 112 and that also result from the data 114 expected to be stored on the hard disk drives 104 can include one or more of the following. The first such constraint is the desired performance in writing each different type of data to and/or reading each different type of data from the hard disk drives 104. The second such constraint is the expected amount of each different type of data to be written to the hard disk drives 104. The third such constraint is the expected frequency at which each different type of data is read from the hard disk drives 104 after having been written to the drives 104.

For example, a first type of data may be archival data that after being written to the hard disk drives 104, is not expected to be read from the drives 104 often. Therefore, the desired performance of accessing such data (i.e., reading or writing such data) may not be specified, or may be specified as being permitted to be relatively low. There may be a large amount of such data. One or more hard disk drives 104 that rotate at relatively low speeds, to conserve power, but that have large amounts of storage space may thus be selected to store this type of data.

As another example, a second type of data may be data that is frequently used, and thus after being written to the hard disk drives 104, is expected to be read from (and updated on) the drives 104 often. Therefore, the desired performance of accessing such data (i.e., reading or writing such data) may be specified as high. There may not be a large amount of such data, however. One or more hard disk drives 104 that rotate at relatively high speeds, to maximize performance, but that may have small amounts of storage space may thus be selected to store this type of data.

The controller 102 takes into account all these constraints 110 in selecting the number, sizes, and the hard disk drive types 106 of the hard disk drives 104. For example, for a specified level of desired performance, the controller 102 may select the hard disk drives types 106 of the hard disk drives 104 to minimize power consumption while still maintaining the desired performance level. As another example, for a specified level of desired power consumption, the controller 102 may select the hard disk drive types 106 of the hard disk drives 104 to maximize performance while still maintaining the desired power consumption level.

Periodically, the controller 102 may subsequently adjust the number, sizes, and/or the hard disk drive types 106 of the hard disk drives 104. For example, such an adjustment may be responsive to a change in the workload of the hard disk drives 104 changes, such as when the types and/or the amount of data to be stored on the hard disk drives 104 changes. As another example, such an adjustment may be responsive to a change in the desired power consumption and/or the desired performance of the hard disk drives 104, or responsive to new hard disk drives now being available from which the hard disk drives 104 can be selected.

In such situations, the new constraints 110 on which basis the controller 102 adjust the number, sizes, and/or the hard disk drive types 106 of the hard disk drives 104 are the same as before, or represent changes in the previously used constraints 110. For instance, the new constraints 110 can include a change in the desired power consumption by the hard disk drives 104, and/or a change in the desired performance in writing each different type of data to and/or reading each different type of data from the hard disk drives 104. Other new constraints 110 can include a change in the expected amount of each different type of data to be written to the hard disk drives 104, as well as a change in the expected frequency at which each different type of data is read from the hard disk drives 104 after having been written to the drives 104.

Once the hard disk drives 104 have been selected or reselected, data is written to and read from the hard disk drives 104 as directed or managed by the controller 102. When particular data is to be written to the hard disk drives 104, the controller 102 selects the specific hard disk drive 104 to which this data is to be written, based on the type of the data to be written. As noted above, for example, archival data may be written to relatively slow but power-efficient hard disk drives, whereas frequently accessed data may be written to relatively fast but power-inefficient hard disk drives. When desired data is to be read from the hard disk drives 104, the controller 102 determines to which particular hard disk drive 104 the desired data was previously written, and reads the data from this particular hard disk drive 104.

Figure 2:
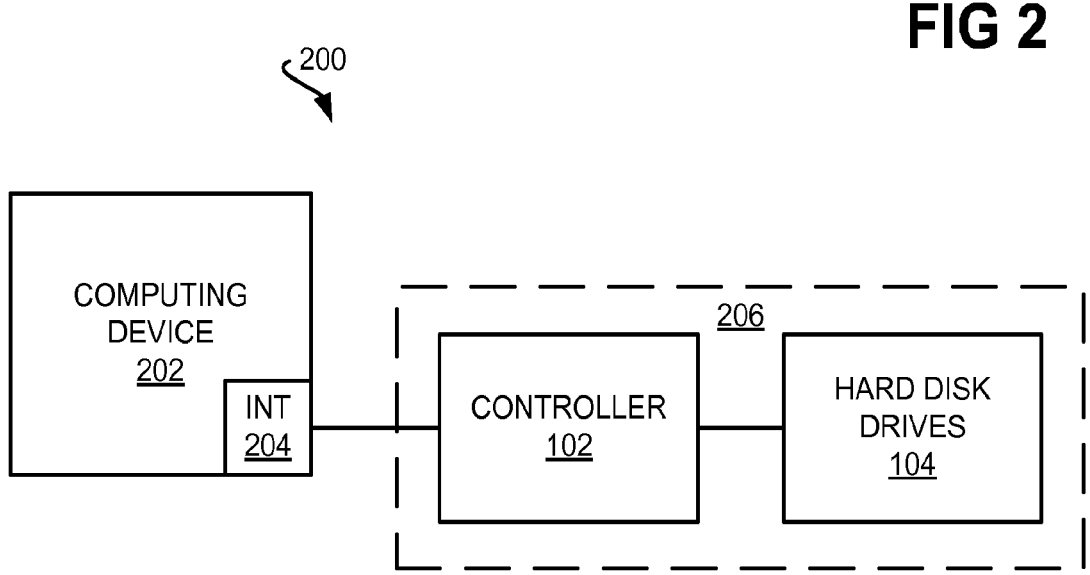
FIG. 2 is a diagram of a particular topology of the system of FIG. 1, according to an embodiment of the present disclosure.
Figure 3:
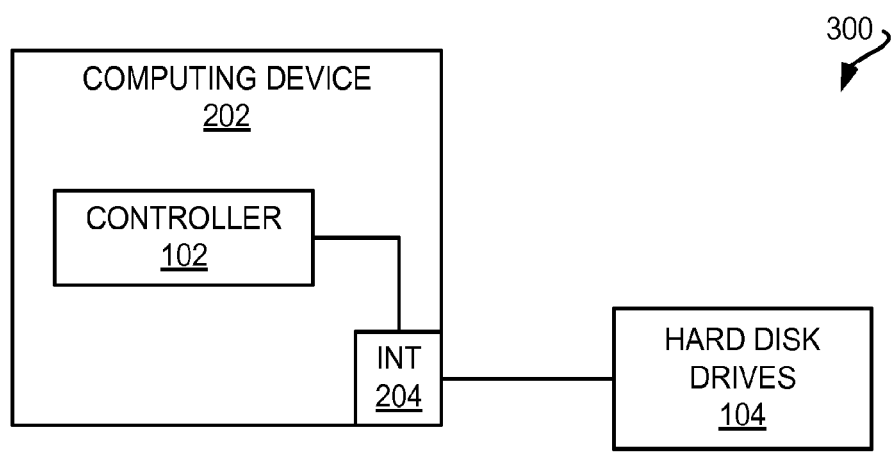
FIG. 3 is a diagram of another particular topology of the system of FIG. 1, according to an embodiment of the present disclosure.

FIGS. 2 and 3 show different topologies 200 and 300, respectively, in relation to which the system 100 of FIG. 1 can be implemented, according to different embodiments of the disclosure. In FIG. 2, a computing device 202 is communicatively connected to the controller 102 via one or more interfaces 204. The controller 102 is external to the computing device 202. The controller 102 and the hard disk drives 104 can be in a common enclosure in one embodiment, as indicated by the dotted-line box 206.

In the embodiment of FIG. 2, the computing device 202 treats the hard disk drives 104 as a single logical storage volume when reading data from and writing data to the hard disk drives 104. The computing device 202 is not necessarily aware that the single logical storage volume is made up of a number of different hard disk drives 104. This is because communication between the computing device 202 and the hard disk drives 104 occurs via the external controller 102.

In one embodiment, the interface 204 may be a standard hard disk drive interface that is normally used to directly attach the computing device 202 to a single hard disk drive. Examples of such hard disk drive interfaces include parallel AT attachment (PATA) interfaces, serial AT attachment (SATA) interfaces, and the small computer system interface (SCSI), among other types of such interfaces. Thus, rather than connecting a single hard disk drive to such an interface 204 of the computing device 202, the controller 102 is instead connected to the interface 204 in this embodiment.

In another embodiment, the interface 204 may be a network-type interface that can be used to indirectly attach the computing device 202 to the controller 102 over a network. Examples of such network-type interfaces include Ethernet, wireless network interfaces, wired network interfaces, and/or storage-array network (SAN) interfaces, among other types of such interfaces. The network may be or include a local-area network (LAN), a wide-area network (SAN), intranets, extranets, SAN's, and/or the Internet, among other types of networks. In this embodiment, the computing device 202 and the controller 102 are communicatively connected to one another over a network.

In either embodiment, the controller 102 may be directly connected to the hard disk drives 104, or indirectly connected to the hard disk drives 104. The controller 102 may be directed connected to each hard disk drive 104 using a standard hard disk drive interface. The controller 102 may be indirectly connected to each hard disk drive 104 using a network-type interface.

In FIG. 3, the controller 102 is an internal part of the computing device 202. The hard disk drives 104 are depicted in FIG. 3 as being external to the computing device 202. However, in another embodiment, the hard disk drives 104 may also be internal to the computing device 202.

In the embodiment of FIG. 3, the computing device 202 can still treat the hard disk drives 104 as a single logical storage volume when reading data from and writing data to the hard disk drives 104. However, the computing device 202 is necessarily aware that the single logical storage volume is made up of a number of different hard disk drives 104. This is because the controller 102 that manages writing data to and reading data from the hard disk drives 104 is part of the computing device 202.

The controller 102 is communicatively connected to the hard disk drives 104 in FIG. 3 via the interface 204. In one embodiment, the interface 204 may be a standard hard disk drive interface. In another embodiment, the interface 204 may be a network-type interface.

In both FIGS. 2 and 3, while just one interface 204 is depicted, in actuality there can be more than one such interface. Furthermore, the controller 102 may be implemented in hardware, software, or a combination of hardware and software. The computing device 202 may be a desktop or a laptop computer, having one or more processors, memory, and so on.

In conclusion, FIG. 4 shows a method 400, according to an embodiment of the disclosure. The number, sizes, and the hard disk drive types of the hard disk drives 104 are selected taking into account the constraints 110 (402), as has been described. Part 402 and 404 of the method 400 can be periodically reperformed, such as when the workload of the hard disk drives 104 changes.

Data is written to the hard disk drives 104 (404) as follows. The hard disk drive 104 to which the data is to be written is determined (406). For instance, based on the type of the data, the hard disk drive 104 to which the data should be written can be looked up in a previously constructed lookup table. For example, for archival data, a relatively slow but relatively power-efficient hard disk drive 104 may be selected, whereas for frequently accessed data, a relatively fast but relatively power-inefficient hard disk drive 104 may be selected. The data is then written to the hard disk drive 104 in question (408).

Data is read from the hard disk drives 104 (410) as follows. The hard disk drive 104 to which the data was previously written is determined (412). For example, the request to read the data may specify a disk sector, which can be correlated to the hard disk drive 104 that includes this disk sector. Alternatively, the same or different previously constructed lookup table may be employed to determine the hard disk drive 104 to which the data was previously written, based on, for instance, the type of the data to be read. The data is then read from the hard disk drive 104 in question (414).

We claim:

1. A system comprising:
a controller;
a plurality of hard disk drives connected to the controller, each hard disk drive selected from a plurality of different hard disk drive types, each hard disk drive type having a different speed at which the hard disk drives of the hard disk drive type rotate to read and write data, such that at least one of the hard disk drives is of a different hard disk drive type than at least one other of the hard disk drives; wherein
prior to writing any data to the hard disk drives, the controller selects, from the plurality of hard disk drives and in accordance with one or more constraints, a set of hard disk drives to which data is to be written, such that the hard disk drives that are not selected are powered down; and
responsive to a request to write particular data to the hard disk drives, the controller selects a given hard disk drive of the set of hard disk drives based on a type of the particular data, and writes the particular data to the given hard disk drive.

2. The system of claim 1, wherein a first hard disk drive type has just a single first speed at which the hard disk drives of the first hard disk drive type rotate to read and write data, wherein a second hard disk drive type has just a single second speed at which the hard disk drives of the second hard disk drive type rotate to read and write data, and wherein the second speed is different than the first speed.

3. The system of claim 2, wherein a third hard disk drive type has a plurality of different speeds at which the hard disk drives of the third hard disk drive type rotate to read data from and write data to the hard disk drives of the third hard disk drive type.

4. The system of claim 1, wherein all data written to a given hard disk drive while being rotated at a particular speed can only be read from the given hard disk drive while the given hard disk drive is rotated at the particular speed and not at any other speed.

5. The system of claim 1, wherein the controller selecting the set of hard disk drives to which data is to be written comprises an initial selection of a number of the hard disk drives, a size of each hard disk drive, and a hard disk drive type of each hard disk drive based on the constraints, the constraints comprising one or more of:
- an expected amount of each of a plurality of different types of data to be written to the hard disk drives;
- an expected frequency of reading each different type of data after having been written to the hard disk drives;
- a desired performance in writing each different type of data to or reading each different type of data from the hard disk drives;
- a total cost of all the hard disk drives; and,
- a desired power consumption by the hard disk drives.

6. The system of claim 5, wherein one of:
- the desired power consumption is to be minimized for a specified level of the desired performance; and,
- the desired performance is to be maximized for a specified level of the desired power consumption.

7. The system of claim 5, wherein the controller is to subsequently change the number of the hard disk drives, the size of each hard disk drive, and/or the hard disk drive type of each hard disk drive based on one or more additional constraints, the additional constraints comprising one or more of:
- a change in the expected amount of each different type of data to be written to the hard disk drives;
- a change in the expected frequency of reading each different type of data after having been written to the hard disk drives;
- a change in the desired performance in writing each different type of data to or reading each different type of data from the hard disk drives; and,
- a change in the desired power consumption by the hard disk drives.

8. The system of claim 1, wherein the controller is, responsive to a request to read desired data from the hard disk drives, to determine a particular hard disk drive of the hard disk drives to which the desired data was previously written, and to read the desired data from the particular hard disk drive.

9. The system of claim 1, wherein the controller interfaces the hard disk drives to a computing device communicatively connected to the controller, such that the computing device treats the hard disk drives as a single logical storage volume when reading data from and writing data to the hard disk drives and is not necessarily aware that the single logical storage volume is made up of the hard disk drives.

10. The system of claim 1, wherein the controller is part of a computing device communicatively connected to the hard disk drives, such that the computing device is necessarily aware that the single logical storage volume is made up of the hard disk drives but still treats the hard disk drives as a single logical storage volume when reading data from and writing data to the hard disk drives.

11. A computing device comprising:
- one or more interfaces to communicatively connect the computing device to a plurality of hard disk drives, each hard disk drive selected from a plurality of different hard disk drive types, each hard disk drive type having a different speed at which the hard disk drives of the hard disk drive type rotate to read and write data, such that at least one of the hard disk drives is of a different hard disk drive type than at least one other of the hard disk drives;

wherein prior to writing any data to the hard disk drives, a controller selects, from the plurality of hard disk drives and in accordance with one or more constraints, a set of hard disk drives to which data is to be written, such that the hard disk drives that are not selected are powered down; and responsive to a request to write particular data to the hard disk drives, the controller selects a given hard disk drive of the set of hard disk drives to which to write the particular data based on a type of the particular data.

12. The computing device of claim 11, wherein the controller selecting the set of hard disk drives to which data is to be written comprises an initial selection of a number of the hard disk drives and a hard disk drive type of each hard disk drive based on the constraints, the constraints comprising one or more of:
- an expected amount of each of a plurality of different types of data to be written to the hard disk drives;
- an expected frequency of reading each different type of data after having been written to the hard disk drives;
- a desired performance in writing each different type of data to or reading each different type of data from the hard disk drives; a total cost of all the hard disk drives; and,
- a desired power consumption by the hard disk drives.

13. The computing device of claim 12, wherein the controller is to subsequently change the number of the hard disk drives and/or the hard disk drive type of each hard disk drive based on one or more additional constraints, the additional constraints comprising one or more of:
- a change in the expected amount of each different type of data to be written to the hard disk drives;
- a change in the expected frequency of reading each different type of data after having been written to the hard disk drives;
- a change in the desired performance in writing each different type of data to or reading each different type of data from the hard disk drives; and,
- a change in the desired power consumption by the hard disk drives.

14. A method comprising:
- prior to writing any data to a plurality of hard disk drives, selecting, from the plurality of hard disk drives, a set of hard disk drives to which data is to be written, such that the hard disk drives that are not selected are powered down, wherein selecting the set of hard disk drives comprises selecting a number of the hard disk drives, and selecting a hard disk drive type of each hard disk drive from a plurality of different hard disk drive types having different speeds at which the hard disk drives rotate to read and write data, such that at least one of the hard disk drives is of a different hard disk drive type than at least one other of the hard disk drives, the number of the hard disk drives and the hard disk drive types of the hard disk drives selected based on one or more constraints, the constraints comprising one or more of:
- an expected amount of each of a plurality of different types of data to be written to the hard disk drives;
- an expected frequency of reading each different type of data after having been written to the hard disk drives;
- a desired performance in writing each different type of data to or reading each different type of data from the hard disk drives; a total cost of all the hard disk drives; and,
- a desired power consumption by the hard disk drives;

in response to a request to write particular data to the hard disk drives, selecting a given hard disk drive of the set of hard disk drives based on a type of the particular data, and writing the particular data to the given hard disk drive; and, in response to a request to read desired data from the hard disk drives, determining a particular hard disk drive of the set of hard disk drives to which the desired data was previously written, and reading the desired data from the particular hard disk drive.

15. The method of claim 14, further comprising subsequently changing the number of the hard disk drives and/or the hard disk drive type of each hard disk drive based on one or more additional constraints, the additional constraints comprising one or more of:

a change in the expected amount of each different type of data to be written to the hard disk drives;

a change in the expected frequency of reading each different type of data after having been written to the hard disk drives;

a change in the desired performance in writing each different type of data to or reading each different type of data from the hard disk drives; and, a change in the desired power consumption by the hard disk drives.

* * * * *